US011989122B2

(12) United States Patent
Tateishi (10) Patent No.: US 11,989,122 B2
(45) Date of Patent: May 21, 2024

(54) HANDLING MOCK OBJECTS THAT ARE WRITTEN IN THE FORM OF MULTIPLE ASSIGNMENT INSTRUCTIONS

(71) Applicant: International Business Machines Corporation, Armonk, NY (US)

(72) Inventor: Takaaki Tateishi, Yamato (JP)

(73) Assignee: International Busi Corporation ess Machines, Armonk, NY (US)

( * ) Notice: Subject to any disclaimer, the term of this patent is extended or adjusted under 35 U.S.C. 154(b) by 45 days.

(21) Appl. No.: 17/853,179

(22) Filed: Jun. 29, 2022

(65) Prior Publication Data

US 2024/0004784 A1  Jan. 4, 2024

(51) Int. Cl.
| G06F 9/44 | (2018.01) |
| G06F 8/41 | (2018.01) |
| G06F 9/455 | (2018.01) |
| G06F 11/34 | (2006.01) |
| G06F 11/36 | (2006.01) |

(52) U.S. Cl.
CPC ...... G06F 11/3688 (2013.01); G06F 11/3664 (2013.01)

(58) Field of Classification Search
CPC .... G06F 11/3688; G06F 11/3664; G06F 8/20; G06F 11/3684; G06F 11/3447; G06F 11/30; G06F 9/455; G06F 11/3696; G06F 11/362; G06F 11/3636; G06F 9/454; G06F 9/54; G06F 3/0484; G06F 9/44521; G06F 9/451; H04L 43/00
See application file for complete search history.

(56) References Cited

U.S. PATENT DOCUMENTS

| 8,799,875 B2 * | 8/2014 | Ziegler ............... G06F 11/3696 717/135 |
| 2007/0033443 A1 | 2/2007 | Tillmann et al. |
| 2012/0084754 A1 | 4/2012 | Ziegler et al. |

FOREIGN PATENT DOCUMENTS

CN  105335281 B  3/2018

OTHER PUBLICATIONS

Github, Inc., "Rspec/Rspec-Mocks," https://github.com/rspec/rspec-mocks, 2021, pp. 1-12.

(Continued)

*Primary Examiner* — Thuy Dao
(74) *Attorney, Agent, or Firm* — Shackelford, Bowen, McKinley & Norton, LLP; Robert A. Voigt, Jr.

(57) ABSTRACT

A computer-implemented method, system and computer program product for effectively handling mock objects written in the form of multiple assignment instructions. A program to test software is instrumented so as to obtain an instrumented program having one or more mock objects. The instrumented program is parsed to identify one or more multiple assignment instructions each corresponding to a mock object. A function is then inserted in the instrumented program for each of the identified multiple assignment instructions corresponding to a mock object, where the function returns a tuple of the first "n" elements of the mock object. The instrumented program (after inserting the function(s) discussed above) is outputted to perform software testing, such as dynamic program analysis. In this manner, by inserting such function(s) in the instrumented program, the mock objects will be able to be executed without causing a failure.

20 Claims, 4 Drawing Sheets

(56) References Cited

OTHER PUBLICATIONS

Python, "Unittest.Mock—Mock Object Library," https://docs.python.org/3/library/unittest.mock.html, 2021, pp. 1-45.
Lockwood et al., "Mockingbird: A Framework for Enabling Targeted Dynamic Analysis of Java Programs," https://ieeexplore.ieee.org/document/8802746, ICSE'19, May 2019, pp. 1-4.
Jens Nordahl, "EasyMock: Capturing Arguments from Multiple Cells," https://blog.jayway.com/2009/03/25/easymock-capturing-arguments-from-multiple-calls, Mar. 25, 2009, pp. 1-23.
Matthew Bauer, "Mock Python Function with Multiple Return Values," https://stackoverflow.com/questions/35774094/mock-python-function-with-multiple-return-values/35774229, Mar. 2016, pp. 1-3.
Trey Hunner, "Multiple Assignment and Tuple Unpacking Improve Python Code Readability," https://treyhunner.com/2018/03/tuple-unpacking-improves-python-code-readability, Mar. 7, 2018, pp. 1-10.
Takaaki Tateishi, "Semantic Data Science," https://developer.ibm.com/apis/catalog/automatedai-IBM-research-semantic-data-science/api/API-automatedai--IBM-research-semantic-data-science/#get202185299, Apr. 2, 2022, pp. 1-5, Grace Period Disclosure.

\* cited by examiner

HANDLING MOCK OBJECTS THAT ARE WRITTEN IN THE FORM OF MULTIPLE ASSIGNMENT INSTRUCTIONS

STATEMENT REGARDING PRIOR DISCLOSURES BY THE INVENTOR OR JOINT INVENTOR

The following disclosure(s) are submitted under 35 U.S.C. 102(b)(1)(A):

TAKAAKI TATEISHI, "Semantic Data Science," Apr. 2, 2022, pp. 1-5.

TECHNICAL FIELD

The present disclosure relates generally to software testing, and more particularly to handling mock objects that are written in the form of multiple assignment instructions in a program for testing software.

BACKGROUND

Software testing is the act of examining the artifacts and the behavior of the software under test by validation and verification. Software testing can also provide an objective, independent view of the software to allow the business to appreciate and understand the risks of software implementation. Software testing can provide objective, independent information about the quality of the software and the risk of its failure to users or sponsors.

SUMMARY

In one embodiment of the present disclosure, a computer-implemented method for handling mock objects written in a form of multiple assignment instructions comprises instrumenting a program to obtain an instrumented program having one or more mock objects, where the one or more mock objects are simulated objects that mimic a behavior of real objects. The method further comprises parsing the instrumented program to identify one or more multiple assignment instructions each corresponding to a mock object. The method additionally comprises inserting a first function in the instrumented program for each of the one or more identified multiple assignment instructions, where the first function returns a tuple of a first n elements of the mock object, where the n is a positive integer number. Furthermore, the method comprises outputting the instrumented program to perform software testing after inserting the first function in the instrumented program for each of the one or more identified multiple assignment instructions.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

As stated in the Background section, software testing is the act of examining the artifacts and the behavior of the software under test by validation and verification. Software testing can also provide an objective, independent view of the software to allow the business to appreciate and understand the risks of software implementation. Software testing can provide objective, independent information about the quality of the software and the risk of its failure to users or sponsors.

One example of software testing is dynamic program analysis. Dynamic program analysis is the analysis of computer software that is performed by executing programs on a real or virtual processor. For dynamic program analysis to be effective, the target program needs to be executed with sufficient test inputs to cover almost all possible outputs. Use of software testing measures, such as code coverage, help ensure that an adequate slice of the program's set of possible behaviors has been observed.

In dynamic program analysis, mock objects may be utilized to test the software. In object-oriented programming, a mock object is a simulated object that mimics the behavior of the smallest testable parts of an application in controlled ways, most often as part of a software testing initiative, such as dynamic program analysis. A programmer typically creates a mock object to test the behavior of some other object in much the same way that a car designer uses a crash test dummy to simulate the dynamic behavior of a human in vehicle impacts.

Mock objects have the same interface as the real objects they mimic thereby allowing a client object to remain unaware of whether it is using a real object or a mock object. Many available mock object frameworks allow the programmer to specify which, and in what order, methods will be invoked on a mock object and what parameters will be passed to them as well as what values will be returned. Thus, the behavior of a complex object, such as a network socket, can be mimicked by a mock object, allowing the programmer to discover whether the object being tested responds appropriately to the wide variety of states such mock objects may be in.

Many programming scripting languages, such as Python® and Ruby®, can return multiple values, such as from a method. For example, the os.path.splito method may return multiple values. For instance, the statement dir, file=os.path.split("/foo/bar.txt") in the Python® programing language returns multiple values. Such statements may be referred to as "multiple assignment" instructions. A multiple assignment instruction is an assignment statement in which one or more values are given to two or more variables.

Mock objects may be written in the form of such multiple assignment instructions. A method call of such mock objects though may not return multiple values because the method call does not have any information about how many items should be returned. As a result, a multiple assignment instruction in scripting languages, such as Python® and Ruby®, results in a failure. For example, the multiple assignment instruction dir, file=mocko.split("/foo/bar.text") would result in a failure.

However, the use of mock objects written in the form of multiple assignment instructions in such scripting languages is essential in order to perform a dynamic program analysis.

As a result, attempts have been made to avoid such failures by manually defining the default return values at the time of the creation of the mock object, such as via Python®'s unittest.mock package. However, such an approach requires having knowledge of the number of values each method returns, which is infeasible.

An alternative approach to avoid such failures is to modify the implementation of an existing scripting language to support built-in mock objects and/or to reveal the necessary information. However, modifying the implementation of the scripting language to support built-in mock objects and/or to reveal the necessary implementation is time-consuming and difficult.

Unfortunately, there is not currently a means for effectively handling mock objects written in the form of multiple assignment instructions in scripting programming languages, such as Python® and Ruby®, such as in programs to test software by performing dynamic program analysis.

The embodiments of the present disclosure provide a means for effectively handling mock objects written in the form of multiple assignment instructions in programs to test software, such as by performing dynamic program analysis, by instrumenting the program and inserting a function in the instrumented program for each identified multiple assignment instruction that was written as a mock object, where the function returns a tuple of the first "n" elements of the mock object, where "n" corresponds to a counted number of variables in the multiple assignment instruction. By inserting such a function in the instrumented program, the mock objects will be able to be executed without causing a failure as discussed in further detail below.

In some embodiments of the present disclosure, the present disclosure comprises a computer-implemented method, system and computer program product for handling mock objects written in the form of multiple assignment instructions. In one embodiment of the present disclosure, a program to test software is instrumented so as to obtain an instrumented program having one or more mock objects. "Instrumentation," as used herein, refers to the measure of a software product's performance, to diagnose errors, and to write trace information. In one embodiment, such an instrumented program contains one or more mock objects. A "mock object," as used herein, refers to a simulated object that mimics the behavior of the smallest testable parts of an application in controlled ways, most often as part of a software testing initiative, such as dynamic program analysis. For example, a mock object may be created to test the behavior of another object. The instrumented program is parsed to identify one or more multiple assignment instructions each corresponding to a mock object. A "multiple assignment instruction," as used herein, is an assignment statement in which one or more values are given to two or more variables.

A "multiple assignment instruction corresponding to a mock object," as used herein, refers to a mock object written in the form of a multiple assignment instruction. A function is then inserted in the instrumented program for each of the identified multiple assignment instructions corresponding to a mock object, where the function returns a tuple of the first "n" elements of the mock object. The instrumented program (after inserting the function(s) discussed above) is outputted to perform software testing, such as dynamic program analysis. In this manner, by inserting such function(s) in the instrumented program, the mock object(s) will be able to be executed without causing a failure.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Figure 1:
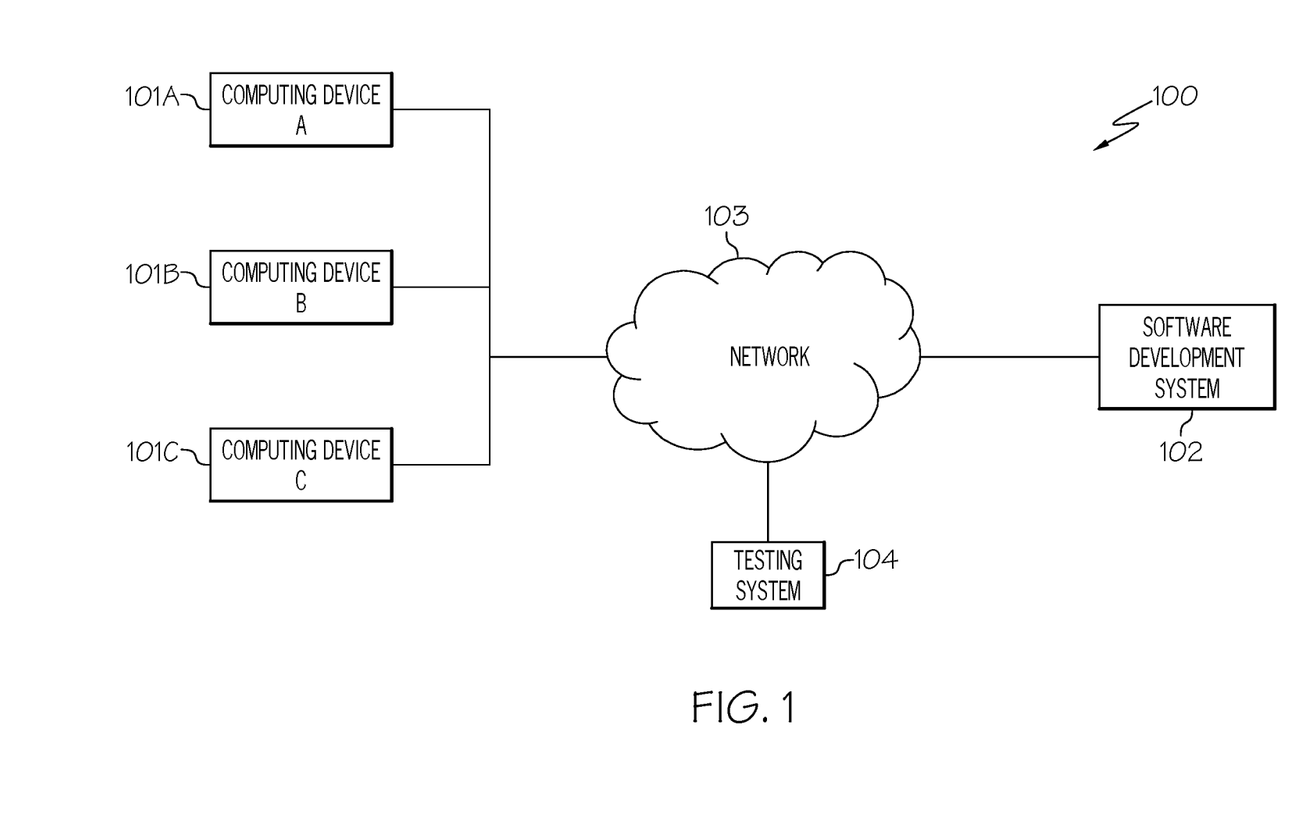
FIG. 1 illustrates a communication system for practicing the principles of the present disclosure in accordance with an embodiment of the present disclosure.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a software development system 102 via a network 103. Computing devices 101A-101C may collectively or individually be referred to as computing devices 101 or computing device 101, respectively.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and software development system 102. It is noted that both computing device 101 and the user of computing device 101 may be identified with element number 101.

Software development system 102 is a system utilized, such as by software developers (e.g., users of computing devices 101), in the process of creating, designing, deploying and supporting software. Examples of such software development systems include, but not limited to, RAD Studio®, Embold®, Collaborator®, Studio 3T®, NetBeans®, Zend Studio®, Microsoft® Expression Studio, etc.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

System 100 further includes a testing system 104 interconnected with computing devices 101 and software development system 102 via network 103. In one embodiment, testing system 104 is configured to test software applications, such as by using dynamic program analysis. As previously discussed, dynamic program analysis is the analysis of computer software that is performed by executing programs on a real or virtual processor. For dynamic program analysis to be effective, the target program needs to be executed with sufficient test inputs to cover almost all possible outputs. Use of software testing measures, such as code coverage, help ensure that an adequate slice of the program's set of possible behaviors has been observed.

In dynamic program analysis, mock objects may be utilized to test the software. In object-oriented programming, a mock object is a simulated object that mimics the behavior of the smallest testable parts of an application in controlled ways, most often as part of a software testing initiative, such as dynamic program analysis.

In one embodiment, such mock objects are written in the form of multiple assignment instructions. However, a method call of such mock objects though may not return multiple values because the method call does not have any information about how many items should be returned. As a result, a multiple assignment instruction in scripting languages, such as Python® and Ruby®, results in a failure.

In one embodiment, testing system 104 is configured to handle mock objects written in the form of multiple assignment instructions in programs to test software, such as by performing dynamic program analysis, by instrumenting the program and inserting a function in the instrumented program for each identified multiple assignment instruction that was written as a mock object, where the function returns a tuple of the first "n" elements of the mock object, where "n" corresponds to the counted number of variables in the multiple assignment instruction and where "n" is a positive integer number. By inserting such function(s) in the instrumented program, the mock object(s) will be able to be executed without causing a failure as discussed in further detail below.

Furthermore, in one embodiment, testing system 104 inserts a second function in each identified loop instruction of the instrumented program, where the second function returns a list of the functions (discussed in the prior paragraph) that were inserted in the loop instruction.

Additionally, in one embodiment, testing system 104 outputs the instrumented program with the inserted function(s) to perform software testing, such as dynamic program analysis. By inserting such function(s) in the instrumented program, the mock object(s) will be able to be executed without causing a failure.

A description of the software components of testing system 104 used for handling mock objects written in the form of multiple assignment instructions in programs to test software, such as by performing dynamic program analysis, is provided below in connection with FIG. 2. A description of the hardware configuration of testing system 104 is provided further below in connection with FIG. 3.

System 100 is not to be limited in scope to any one particular network architecture. System 100 may include any number of computing devices 101, software development systems 102, networks 103 and testing systems 104.

A discussion regarding the software components used by testing system 104 to handle mock objects written in the form of multiple assignment instructions in programs to test software, such as by performing dynamic program analysis, is provided below in connection with FIG. 2

Figure 2:
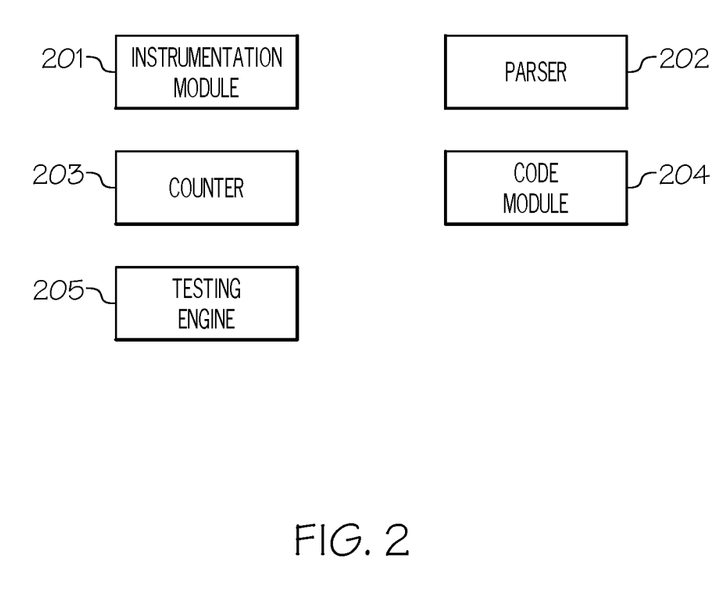
FIG. 2 is a diagram of the software components used by the testing system to handle mock objects written in the form of multiple assignment instructions in programs to test software, such as by performing dynamic program analysis, in accordance with an embodiment of the present disclosure.

FIG. 2 is a diagram of the software components used by testing system 104 (FIG. 1) to handle mock objects written in the form of multiple assignment instructions in programs to test software, such as by performing dynamic program analysis, in accordance with an embodiment of the present disclosure.

Referring to FIG. 2, in conjunction with FIG. 1, testing system 104 includes an instrumentation module 201 configured to instrument a program (program to test software, such as by performing dynamic program analysis). In one embodiment, instrumentation module 201 creates one or more mock objects thereby forming an instrumented program having one or more mock objects. "Instrumentation," as used herein, refers to the measure of a software product's performance, to diagnose errors, and to write trace information. In one embodiment, such instrumentation is a source instrumentation. In one embodiment, such instrumentation is a binary instrumentation.

In one embodiment, instrumentation of a program involves profiling. "Profiling," as used herein, refers to measuring dynamic program behaviors during a training run with a representative input. In another embodiment, instrumentation of a program involves inserting timers into functions. In another embodiment, instrumentation of a program involves logging major events, such as crashes.

In one embodiment, such an instrumented program contains one or more mock objects. A "mock object," as used herein, refers to a simulated object that mimics the behavior of the smallest testable parts of an application in controlled ways, most often as part of a software testing initiative, such as dynamic program analysis. For example, a mock object may be created to test the behavior of another object, such as a real object.

In one embodiment, mock objects have the same interface as the real objects they mimic thereby allowing a client object to remain unaware of whether it is using a real object or a mock object.

In one embodiment, such mock objects are written in the form of a multiple assignment instruction. A "multiple assignment instruction," as used herein, is an assignment statement in which one or more values are given to two or more variables.

Examples of features and techniques utilized by instrumentation module 201 to instrument a program to obtain an instrumented program having one or more mock objects include, but not limited to, hooking (range of techniques used to alter or augment the behavior of the program either by intercepting function calls or messages or events passed between software components), instruction set simulator (simulation of instructions at machine code level to provide instrumentation), runtime intelligence (technologies, managed services and practices for the collection, integration, analysis, and presentation of application usage levels, patterns and practices), software performance analysis (techniques to monitor code performance, including instrumentation), a hardware performance counter, a dynamic tracing framework for troublesome kernel and application problems on production systems, an application response measurement (standardized instrumentation application programming interface), and dynamic recompilation (feature of some emulators and virtual machines where the system may recompile a program during execution).

Examples of software tools used by instrumentation module 201 to instrument a program to obtain an instrumented program having one or more mock objects include, but not limited to, Dynatrace®, SolarWinds® Server & Application Monitor, ManageEngine® Applications Manager, SolarWinds® AppOptics Application Monitoring, AppDynamics®, Splunk® IT Service Intelligence, AppEnsure, etc.

Furthermore, in one embodiment, examples of software tools used by instrumentation module 201 to create mock objects during the instrumentation of a program include, but not limited to, EasyMock, Mockito, JMockit, etc.

An example of a mock object created in the instrumented program by instrumentation module 201 is illustrated in the code snippets shown below. For instance, the original code snippet in Python® prior to instrumentation is shown below:

from sklearn.model_selection import train_test_split
      X_train, X_test, y_train, y_test=train_test_split (train_X, train_y, test_size=0.2, stratify=train_y)

Upon instrumenting the above code by instrumentation module 201, instrumentation module 201 creates a mock object in the instrumented code as shown below:

from sklearn.model_selection import train_test_split
    train_test_split=instrument(train_test_split)
      X_train, X_test, y_train, y_test=train_test_split (train_X, train_y, test_size=0.2, stratify=train_y)

In the example shown above, instrumentation module 201 inserted the "instrument" function to create a mock object (instrument(train_test_split) representing the "train_test_split" function.

Furthermore, testing system 104 includes a parser 202 configured to parse the instrumented program to identify one or more multiple assignment instructions each corresponding to a mock object. Additionally, parser 202 is configured to parse the instrumented program to identify each loop instruction containing the identified multiple assignment instruction(s) corresponding to the mock object(s).

In one embodiment, parser 202 breaks the instrumented program into parts (e.g., nouns (objects), verbs (methods) and their attributes or options) that can be managed by other programming (e.g., components in a compiler). In one embodiment, the multiple assignment instructions are identified by identifying the syntax for creating tuples. For example, the syntax (x, y)=(10, 20) in a line of code involves creating a tuple of 10, 20 and then looping over that tuple and taking each of the two items obtained from looping and assigning them to x and y in order.

In another embodiment, multiple assignment instructions use an iterable, such as a list or string, in which the multiple assignment instruction loops over the list or string. As a result, parser 202 is configured to identify the syntax for looping over lists and strings thereby identifying a multiple assignment instruction.

Upon identifying multiple assignment instructions, such instructions are identified as corresponding to mock objects based on identifying various types of mock objects written as the multiple assignment instructions. An example of a type of mock object includes a dummy (a class that you pass into something when one does not care how it is used, such as a "niceMock" in EasyMock or a "mock" in JMock).

Another example of a type of mock object is a stub (a class that returns a valid answer but always the same one). For example, in the EasyMock language, a stub is a mock with an expectation recorded, such as shown in the following line of code:

(expect(mock.authorize(anyString( ), anyString( ))). andStubReturn(true))

Another example of a type of mock object is a spy. In EasyMock, the spy type of mock object means stubbing is not occurring anymore. A precise call is recorded as shown in the following line of code:

(expect(mock.authorize(anyString( ), anyString( ))). andReturn(true))

and then the call is verified that it actually occurred as shown in the following line of code:

(verify(mock))

In Mockito, the call is stubbed and the call is verified that it occurred as shown in the following line of code:

(verify(authorizer).authorize(any( ), any( )))

A further example of a type of mock is a "true mock." A "true mock" is a mock that knows how to verify itself. For example, EasyMock and Mockito mocks are true mocks. As a result, their implementations of a true mock is the same as for the spy.

Another example of a type of mock is a "fake." A fake has business behavior. Furthermore, a fake can be driven to behave in different ways by giving it different data. For instance, a fake may be used for integration testing to stimulate parts of a system.

Examples of software tools utilized by parser 202 to identify multiple assignment instructions as corresponding to mock objects based on identifying various types of mock objects associated with the multiple assignment instructions include, but not limited to, MockExtractor.

In an alternative embodiment, parser 202 identifies multiple assignment instructions as corresponding to mock objects based on identifying certain terms ("mock( )," "Mockito.mock( )"), such as in API calls, method calls, etc., in the multiple assignment instructions of the instrumented program. In one embodiment, such terms may be identified by parser 202 using natural language processing. For example, such terms may be stored in a data structure (e.g., table) which are used by parser 202 to identify such terms in the multiple assignment instruction(s) using natural language processing. In one embodiment, the data structure is stored in a storage device (e.g., memory, disk drive) of testing system 104.

As previously discussed, parser 202 is further configured to parse the instrumented program to identify each loop instruction containing the identified multiple assignment instruction(s) corresponding to a mock object(s). Examples of software tools utilized by parser 202 to identify such loop instructions containing the identified multiple assignment instruction(s) include, but not limited to, LoopProf.

In an alternative embodiment, parser 202 identifies loop instructions containing the identified multiple assignment instruction(s) corresponding to a mock object(s) based on identifying certain terms ("while," do-while," "for," etc.) in the instrumented program near the identified multiple assignment instruction(s) corresponding to a mock object(s). In one embodiment, such terms may be identified by parser 202 using natural language processing. For example, such terms may be stored in a data structure (e.g., table) which are used by parser 202 to identify such terms in the instrumented program near the identified multiple assignment instruction(s) using natural language processing. In one embodiment, the data structure is stored in a storage device (e.g., memory, disk drive) of testing system 104.

Furthermore, testing system 104 includes a counter 203 configured to count the number of variables in each of the identified multiple assignment instructions corresponding to a mock object. A "variable," as used herein, refers to the symbolic name for (or reference to) information. In one embodiment, the counted variables correspond to the variables located in the left-hand side of the multiple assignment instruction.

In one embodiment, a counter variable is used by counter 203 to count the number of variables in each of the identified multiple assignment instructions corresponding to a mock object. In one embodiment, such variables are identified based on identifying the different types of variables in the instrumented program, such as constants, global variables, class variables, instance variables and local variables. In one embodiment, such variables are identified by counter 203 based on identifying a special character at the start of the variable name, such as in Ruby®. In one embodiment, the number of such variables that are counted in each of the identified multiple assignment instructions is stored in a data structure (e.g., table) residing in a storage device (e.g., memory, disk drive) of testing system 104. In one embodiment, the number of variables that are counted in an identified multiple assignment instruction (identified as corresponding to a mock object) is associated with the identified multiple assignment instruction in the data structure discussed above.

In one embodiment, counter 203 counts the number of variables, such as via a counter variable, in each of the identified multiple assignment instructions corresponding to a mock object based on identifying the "=" symbol in the identified multiple assignment instruction and counting the number of parameters on the left side of the "=" symbol in the multiple assignment instruction. In one embodiment, such counts are stored in a data structure (e.g., table) residing in a storage device (e.g., memory, disk drive) of testing system 104.

In one embodiment, counter variables are set to an initial value (e.g., 0) from which to begin counting. After setting the counter variable to the initial value, counter 203 utilizes an increment operator (e.g., ++) to increase the value of the counter variable upon identifying a variable (e.g., constant, global variable, class variable, instance variable, local variable, etc.) in the identified multiple assignment instruction as discussed above.

Additionally, testing system 104 includes a code module 204 configured to insert a function in the instrumented program for each of the identified multiple assignment instructions corresponding to a mock object, where the function returns a tuple of the first "n" elements of the mock object, where "n" corresponds to the counted number of variables in the multiple assignment instruction obtained from counter 203 and where "n" is a positive integer number. In one embodiment, the function "mk_tuple(e,n)" is inserted in the instrumented program for each of the identified multiple assignment instructions corresponding to a mock object, where the function "mk_tuple(e,n)" returns a tuple of (e[0], ... , e[n−1]), where e is a mock object.

For example, referring to the above example of the Python® code snippet, the function "mk_tuple" is inserted in the instrumented program as shown below:
from sklearn.model_selection import train_test_split
train_test_split=instrument(train_test_split)
X_train, X_test, y_train, y_test=mk_tuple (train_test_split (train_X, train_y, test_size=0.2, stratify=train_y), 4)

As shown above, the function "mk_tuple" returns a tuple of the first n elements of the mock object, which in this example corresponds to the number 4.

In one embodiment, code module 204 inserts such a function in the instrumented program via a software development tool (e.g., Atom, GitHub®, Chrome® DevTools, BuddyBoss®, Azure®, Vim, etc.).

In one embodiment, code module 204 is further configured to insert a function in each identified loop instruction of the instrumented program, where such a function returns of list of the functions ("mk_tuple") that were inserted in the loop instruction. In one embodiment, the function "mk_tuple_list (z, n)" is a function that returns a list of mk_tuple (z[0], n), ... , mk_tuple (z[m−1], n) if "z" is a mock object, where z[0], ... , z[m−1] are the elements of "z" and "m" is a pre-defined integer value.

In one embodiment, code module 204 inserts such a function in the instrumented program via a software development tool (e.g., Atom, GitHub®, Chrome® DevTools, BuddyBoss®, Azure®, Vim, etc.).

Furthermore, testing system 104 includes a testing engine 205 configured to output the instrumented program (after inserting the function(s) discussed above) to perform software testing, such as dynamic program analysis. By inserting such function(s) in the instrumented program, the mock objects will be able to be executed without causing a failure.

In one embodiment, testing engine 205 outputs the instrumented program to perform software testing using a software testing tool, such as, but not limited to, TestRail®, PractiTest®, Testpad®, Testmo®, SpiraTest®, Loadrunner®, JIRA®, Mantishub, Telerik® Studio, etc.

A further description of these and other functions is provided below in connection with the discussion of the method for handling mock objects written in the form of multiple assignment instructions in scripting programming languages, such as Python® and Ruby®, such as in programs to test software by performing dynamic program analysis.

Prior to the discussion of the method for handling mock objects written in the form of multiple assignment instructions in scripting programming languages, such as Python® and Ruby®, such as in programs to test software by performing dynamic program analysis, a description of the hardware configuration of testing system 104 (FIG. 1) is provided below in connection with FIG. 3.

Figure 3:
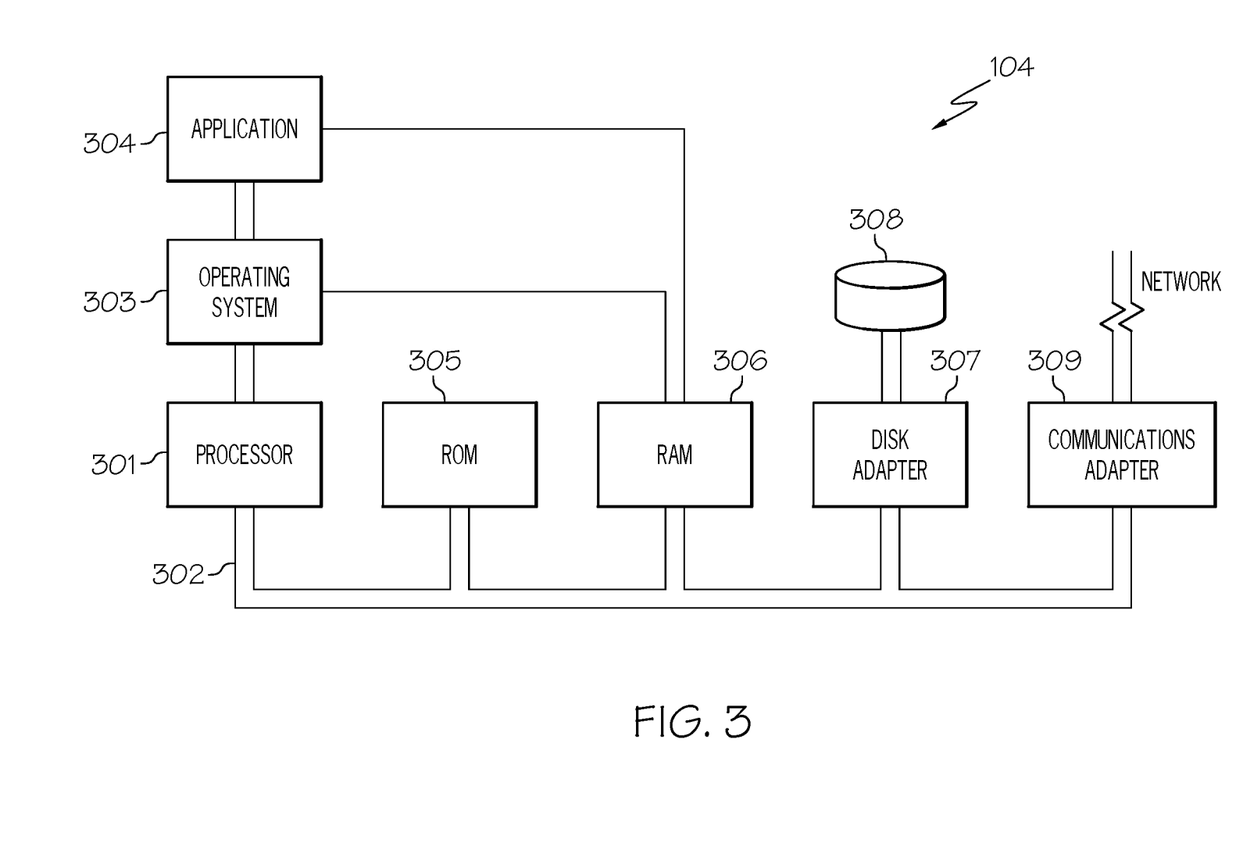
FIG. 3 illustrates an embodiment of the present disclosure of the hardware configuration of the testing system which is representative of a hardware environment for practicing the present disclosure.

Referring now to FIG. 3, FIG. 3 illustrates an embodiment of the present disclosure of the hardware configuration of testing system 104 (FIG. 1) which is representative of a hardware environment for practicing the present disclosure.

Testing system 104 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, instrumentation module 201 (FIG. 2), parser 202 (FIG. 2), counter 203 (FIG. 2), code module 204 (FIG. 2) and testing engine 205 (FIG. 2). Furthermore, application 304 may include, for example, a program for handling mock objects written in the form of multiple assignment instructions, such as in programs to test software by performing dynamic program analysis, as discussed further below in connection with FIG. 4.

Referring again to FIG. 3, read-only memory ("ROM") 305 is connected to system bus 302 and includes a basic input/output system ("BIOS") that controls certain basic functions of testing system 104. Random access memory ("RAM") 306 and disk adapter 307 are also connected to system bus 302. It should be noted that software components including operating system 303 and application 304 may be loaded into RAM 306, which may be testing system's 104 main memory for execution. Disk adapter 307 may be an integrated drive electronics ("IDE") adapter that communicates with a disk unit 308, e.g., disk drive. It is noted that the program for handling mock objects written in the form of multiple assignment instructions, such as in programs to test software by performing dynamic program analysis, as discussed further below in connection with FIG. 4, may reside in disk unit 308 or in application 304.

Testing system 104 may further include a communications adapter 309 connected to bus 302. Communications adapter 309 interconnects bus 302 with an outside network (e.g., network 103 of FIG. 1) to communicate with other devices, such as computing devices 101 and software development system 102 of FIG. 1.

In one embodiment, application 304 of testing system 104 includes the software components of instrumentation module 201, parser 202, counter 203, code module 204 and testing engine 205. In one embodiment, such components may be implemented in hardware, where such hardware components would be connected to bus 302. The functions discussed above performed by such components are not generic computer functions. As a result, testing system 104 is a particular machine that is the result of implementing specific, non-generic computer functions.

In one embodiment, the functionality of such software components (e.g., instrumentation module 201, parser 202, counter 203, code module 204 and testing engine 205) of testing system 104, including the functionality for handling mock objects written in the form of multiple assignment instructions, such as in programs to test software by performing dynamic program analysis, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, in dynamic program analysis, mock objects may be utilized to test the software. In object-oriented programming, a mock object is a simulated object that mimics the behavior of the smallest testable parts of an application in controlled ways, most often as part of a software testing initiative, such as dynamic program analysis. A programmer typically creates a mock object to test the behavior of some other object in much the same way that a car designer uses a crash test dummy to simulate the dynamic behavior of a human in vehicle impacts. Mock objects have the same interface as the real objects they mimic thereby allowing a client object to remain unaware of whether it is using a real object or a mock object. Many available mock object frameworks allow the programmer to specify which, and in what order, methods will be invoked on a mock object and what parameters will be passed to them as well as what values will be returned. Thus, the behavior of a complex object, such as a network socket, can be mimicked by a mock object, allowing the programmer to discover whether the object being tested responds appropriately to the wide variety of states such mock objects may be in. Many programming scripting languages, such as Python® and Ruby®, can return multiple values, such as from a method. For example, the os.path.splito method may return multiple values. For instance, the statement dir, file=os.path.split("/foo/bar.txt") in the Python® programing language returns multiple values. Such statements may be referred to as "multiple assignment" instructions. A multiple assignment instruction is an assignment statement in which one or more values are given to two or more variables. Mock objects may be written in the form of such multiple assignment instructions. A method call of such mock objects though may not return multiple values because the method call does not have any information about how many items should be returned. As a result, a multiple assignment instruction in scripting languages, such as Python® and Ruby®, results in a failure. For example, the multiple assignment instruction dir, file=mocko.split("/foo/bar.text") would result in a failure. However, the use of mock objects written in the form of multiple assignment instructions in such scripting languages is essential in order to perform a dynamic program analysis. As a result, attempts have been made to avoid such failures by manually defining the default return values at the time of the creation of the mock object, such as via Python®'s unittest.mock package. However, such an approach requires having knowledge of the number of values each method returns, which is infeasible. An alternative approach to avoid such failures is to modify the implementation of an existing scripting language to support built-in mock objects and/or to reveal the necessary information. However, modifying the implementation of the scripting language to support built-in mock objects and/or to reveal the necessary implementation is time-consuming and difficult. Unfortunately, there is not currently a means for effectively handling mock objects written in the form of multiple assignment instructions in scripting programming languages, such as Python® and Ruby®, such as in programs to test software by performing dynamic program analysis.

Figure 4:
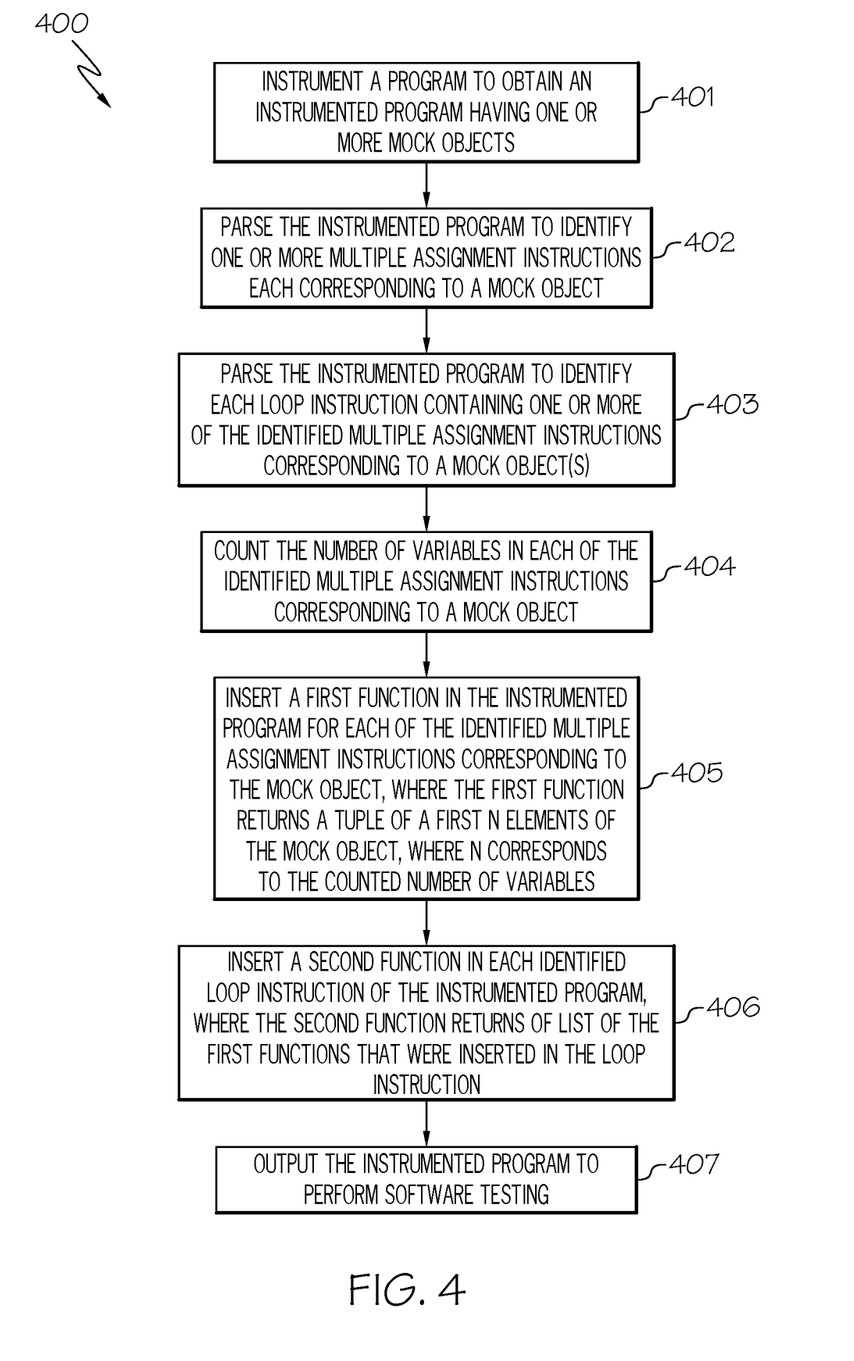
FIG. 4 is a flowchart of a method for handling mock objects written in the form of multiple assignment instructions, such as in programs to test software by performing dynamic program analysis, in accordance with an embodiment of the present disclosure.

The embodiments of the present disclosure provide a means for effectively handling mock objects written in the form of multiple assignment instructions in programs to test software, such as by performing dynamic program analysis, by instrumenting the program and inserting a function in the instrumented program for each identified multiple assignment instruction that was written as a mock object, where the function returns a tuple of the first "n" elements of the mock object, where "n" corresponds to the counted number of variables in the multiple assignment instruction, as discussed below in connection with FIG. 4.

FIG. 4 is a flowchart of a method 400 for handling mock objects written in the form of multiple assignment instructions, such as in programs to test software by performing dynamic program analysis, in accordance with an embodiment of the present disclosure.

Referring to FIG. 4, in conjunction with FIGS. 1-3, in operation 401, instrumentation module 201 of testing system 104 instruments a program (e.g., program to test software, such as by performing dynamic program analysis) to obtain an instrumented program having one or more mock objects.

As discussed above, in one embodiment, instrumentation module 201 creates one or more mock objects thereby forming an instrumented program having one or more mock objects. "Instrumentation," as used herein, refers to the measure of a software product's performance, to diagnose errors, and to write trace information. In one embodiment, such instrumentation is a source instrumentation. In one embodiment, such instrumentation is a binary instrumentation In one embodiment, instrumentation of a program involves profiling. "Profiling," as used herein, refers to measuring dynamic program behaviors during a training run with a representative input. In another embodiment, instrumentation of a program involves inserting timers into functions. In another embodiment, instrumentation of a program involves logging major events, such as crashes.

In one embodiment, such an instrumented program contains one or more mock objects. A "mock object," as used herein, refers to a simulated object that mimics the behavior of the smallest testable parts of an application in controlled ways, most often as part of a software testing initiative, such as dynamic program analysis. For example, a mock object may be created to test the behavior of another object, such as a real object.

In one embodiment, mock objects have the same interface as the real objects they mimic thereby allowing a client object to remain unaware of whether it is using a real object or a mock object.

In one embodiment, such mock objects are written in the form of a multiple assignment instruction. A "multiple assignment instruction," as used herein, is an assignment statement in which one or more values are given to two or more variables.

Examples of features and techniques utilized by instrumentation module 201 to instrument a program to obtain an instrumented program having one or more mock objects include, but not limited to, hooking (range of techniques used to alter or augment the behavior of the program either by intercepting function calls or messages or events passed between software components), instruction set simulator (simulation of instructions at machine code level to provide instrumentation), runtime intelligence (technologies, managed services and practices for the collection, integration, analysis, and presentation of application usage levels, patterns and practices), software performance analysis (techniques to monitor code performance, including instrumentation), a hardware performance counter, a dynamic tracing framework for troublesome kernel and application problems on production systems, an application response measurement (standardized instrumentation application programming interface), and dynamic recompilation (feature of some emulators and virtual machines where the system may recompile a program during execution).

Examples of software tools used by instrumentation module 201 to instrument a program to obtain an instrumented program having one or more mock objects include, but not limited to, Dynatrace®, SolarWinds® Server & Application Monitor, ManageEngine® Applications Manager, SolarWinds® AppOptics Application Monitoring, AppDynamics®, Splunk®IT Service Intelligence, AppEnsure, etc.

Furthermore, in one embodiment, examples of software tools used by instrumentation module 201 to create mock objects during the instrumentation of a program include, but not limited to, EasyMock, Mockito, JMockit, etc.

An example of a mock object created in the instrumented program by instrumentation module 201 is illustrated in the code snippets shown below. For instance, the original code snippet in Python® prior to instrumentation is shown below:

from sklearn.model_selection import train_test_split
X_train, X_test, y_train, y_test=train_test_split (train_X, train_y, test_size=0.2, stratify=train_y)

Upon instrumenting the above code by instrumentation module 201, instrumentation module 201 creates a mock object in the instrumented code as shown below:

from sklearn.model_selection import train_test_split
train_test_split=instrument(train_test_split)
X_train, X_test, y_train, y_test=train_test_split (train_X, train_y, test_size=0.2, stratify=train_y)

In the example shown above, instrumentation module 201 inserted the "instrument" function to create a mock object (instrument(train_test_split) representing the "train_test_split" function.

In operation 402, parser 202 of testing system 104 parses the instrumented program to identify one or more multiple assignment instructions each corresponding to a mock object.

As stated above, in one embodiment, parser 202 breaks the instrumented program into parts (e.g., nouns (objects), verbs (methods) and their attributes or options) that can be managed by other programming (e.g., components in a compiler). In one embodiment, the multiple assignment instructions are identified by identifying the syntax for creating tuples. For example, the syntax (x, y)=(10, 20) in a line of code involves creating a tuple of 10, 20 and then looping over that tuple and taking each of the two items obtained from looping and assigning them to x and y in order.

In another embodiment, multiple assignment instructions use an iterable, such as a list or string, in which the multiple assignment instruction loops over the list or string. As a result, parser 202 is configured to identify the syntax for looping over lists and strings thereby identifying a multiple assignment instruction.

Upon identifying multiple assignment instructions, such instructions are identified as corresponding to mock objects based on identifying various types of mock objects written as the multiple assignment instructions. An example of a type of mock object includes a dummy (a class that you pass into something when one does not care how it is used, such as a "niceMock" in EasyMock or a "mock" in JMock).

Another example of a type of mock object is a stub (a class that returns a valid answer but always the same one). For example, in the EasyMock language, a stub is a mock with an expectation recorded, such as shown in the following line of code:

(expect(mock.authorize(anyString( ), anyString( ))). andStubReturn(true))

Another example of a type of mock object is a spy. In EasyMock, the spy type of mock object means stubbing is not occurring anymore. A precise call is recorded as shown in the following line of code:

(expect(mock.authorize(anyString( ), anyString( ))). andReturn(true))

and then the call is verified that it actually occurred as shown in the following line of code:

(verify(mock))

In Mockito, the call is stubbed and the call is verified that it occurred as shown in the following line of code: (verify (authorizer).authorize(any( ), any( )))

A further example of a type of mock is a "true mock." A "true mock" is a mock that knows how to verify itself. For example, EasyMock and Mockito mocks are true mocks. As a result, their implementations of a true mock is the same as for the spy.

Another example of a type of mock is a "fake." A fake has business behavior.

Furthermore, a fake can be driven to behave in different ways by giving it different data. For instance, a fake may be used for integration testing to stimulate parts of a system.

Examples of software tools utilized by parser 202 to identify multiple assignment instructions as corresponding to mock objects based on identifying various types of mock objects associated with the multiple assignment instructions include, but not limited to, MockExtractor.

In an alternative embodiment, parser 202 identifies multiple assignment instructions as corresponding to mock objects based on identifying certain terms ("mock( )," "Mockito.mock( )"), such as in API calls, method calls, etc., in the multiple assignment instructions of the instrumented program. In one embodiment, such terms may be identified by parser 202 using natural language processing. For example, such terms may be stored in a data structure (e.g., table) which are used by parser 202 to identify such terms in the multiple assignment instruction(s) using natural language processing. In one embodiment, the data structure is stored in a storage device (e.g., memory 305, disk drive 308) of testing system 104.

In operation 403, parser 202 of testing system 104 parses the instrumented program to identify each loop instruction containing one or more of the identified multiple assignment instructions corresponding to a mock object(s).

As discussed above, examples of software tools utilized by parser 202 to identify such loop instructions containing the identified multiple assignment instruction(s) include, but not limited to, LoopProf.

In an alternative embodiment, parser 202 identifies loop instructions containing the identified multiple assignment instruction(s) corresponding to a mock object(s) based on identifying certain terms ("while," do-while," "for," etc.) in the instrumented program near the identified multiple assignment instruction(s) corresponding to a mock object(s). In one embodiment, such terms may be identified by parser 202 using natural language processing. For example, such terms may be stored in a data structure (e.g., table) which are used by parser 202 to identify such terms in the instrumented program near the identified multiple assignment instruction(s) using natural language processing. In one embodiment, the data structure is stored in a storage device (e.g., memory 305, disk drive 308) of testing system 104.

In operation 404, counter 203 of testing system 104 counts the number of variables in each of the identified multiple assignment instructions corresponding to a mock object.

As stated above, a "variable," as used herein, refers to the symbolic name for (or reference to) information. In one embodiment, the counted variables correspond to the variables located in the left-hand side of the multiple assignment instruction.

In one embodiment, a counter variable is used by counter 203 to count the number of variables in each of the identified multiple assignment instructions corresponding to a mock object.

In one embodiment, such variables are identified based on identifying the different types of variables in the instrumented program, such as constants, global variables, class variables, instance variables and local variables. In one embodiment, such variables are identified by counter 203 based on identifying a special character at the start of the variable name, such as in Ruby®. In one embodiment, the number of such variables that are counted in each of the identified multiple assignment instructions is stored in a data structure (e.g., table) residing in a storage device (e.g., memory 305, disk drive 308) of testing system 104. In one embodiment, the number of variables that are counted in an identified multiple assignment instruction (identified as corresponding to a mock object) is associated with the identified multiple assignment instruction in the data structure discussed above.

In one embodiment, counter 203 counts the number of variables, such as via a counter variable, in each of the identified multiple assignment instructions corresponding to a mock object based on identifying the "=" symbol in the identified multiple assignment instruction and counting the number of parameters on the left side of the "=" symbol in the multiple assignment instruction.

In one embodiment, such counts are stored in a data structure (e.g., table) residing in a storage device (e.g., memory 305, disk drive 308) of testing system 104.

In one embodiment, counter variables are set to an initial value (e.g., 0) from which to begin counting. After setting the counter variable to the initial value, counter 203 utilizes an increment operator (e.g., ++) to increase the value of the counter variable upon identifying a variable (e.g., constant, global variable, class variable, instance variable, local variable, etc.) in the identified multiple assignment instruction as discussed above.

In operation 405, code module 204 of testing system 104 inserts a first function in the instrumented program for each of the identified multiple assignment instructions corresponding to a mock object, where the first function returns a tuple of the first "n" elements of the mock object, where "n" corresponds to the counted number of variables in the multiple assignment instruction obtained from counter 203 and where "n" is a positive integer number.

As discussed above, in one embodiment, the function "mk_tuple(e,n)" is inserted in the instrumented program for each of the identified multiple assignment instructions corresponding to a mock object, where the function "mk_tuple (e,n)" returns a tuple of (e[0], . . . , e[n−1]), where e is a mock object.

For example, referring to the above example of the Python® code snippet, the function "mk_tuple" is inserted in the instrumented program as shown below:

from sklearn.model_selection import train_test_split
  train_test_split=instrument(train_test_split)
  X_train, X_test, y_train, y_test=mk_tuple (train_test_split (train_X, train_y, test_size=0.2, stratify=train_y), 4)

As shown above, the function "mk_tuple" returns a tuple of the first n elements of the mock object, which in this example corresponds to the number 4.

In one embodiment, code module 204 inserts such a function in the instrumented program via a software development tool (e.g., Atom, GitHub®, Chrome® DevTools, BuddyBoss®, Azure®, Vim, etc.).

In operation 406, code module 204 of testing system 104 inserts a second function in each identified loop instruction of the instrumented program, where the second function returns of list of the first functions that were inserted in the loop instruction.

As stated above, in one embodiment, code module 204 is further configured to insert a function in each identified loop instruction of the instrumented program, where such a function returns of list of the functions ("mk_tuple") that were inserted in the loop instruction. In one embodiment, the function "mk_tuple_list (z, n)" is a function that returns a list of mk_tuple (z[0], n), . . . , mk_tuple (z[m−1], n) if "z" is a mock object, where z[0], . . . , z[m−1] are the elements of "z" and "m" is a pre-defined integer value.

In one embodiment, code module 204 inserts such a function in the instrumented program via a software development tool (e.g., Atom, GitHub®, Chrome® DevTools, BuddyBoss®, Azure®, Vim, etc.).

In operation 407, testing engine 205 of testing system 104 outputs the instrumented program to perform software testing.

As discussed above, testing engine 205 is configured to output the instrumented program (after inserting the function(s) discussed above) to perform software testing, such as dynamic program analysis. By inserting such function(s) in the instrumented program, the mock objects will be able to be executed without causing a failure.

In one embodiment, testing engine 205 outputs the instrumented program to perform software testing using a software testing tool, such as, but not limited to, TestRail®, PractiTest®, Testpad®, Testmo®, SpiraTest®, Loadrunner®, JIRA®, Mantishub, Telerik® Studio, etc.

In one embodiment, the instrumented program is outputted by testing system 104 to be utilized by the users of computing devices 101 to test the software under development (e.g., software developed using software development system 102), such as by performing dynamic program analysis.

In this manner, the principles of the present disclosure provide the means for effectively handling mock objects in the form of multiple assignment instructions in programs to test software, such as by performing dynamic program analysis, by instrumenting the program to obtain an instrumented program having one or more mock objects and inserting a function in the instrumented program for each identified multiple assignment instruction that was written as a mock object The inserted function returns a tuple of the first "n" elements of the mock object, where "n" corresponds to the counted number of variables in the multiple assignment instruction, such as the number of variables located in the left-hand side of the multiple assignment instruction. By inserting such a function in the instrumented program, the mock objects will be able to be executed without causing a failure.

Furthermore, the principles of the present disclosure improve the technology or technical field involving software testing.

As discussed above, in dynamic program analysis, mock objects may be utilized to test the software. In object-oriented programming, a mock object is a simulated object that mimics the behavior of the smallest testable parts of an application in controlled ways, most often as part of a software testing initiative, such as dynamic program analysis. A programmer typically creates a mock object to test the behavior of some other object in much the same way that a car designer uses a crash test dummy to simulate the dynamic behavior of a human in vehicle impacts. Mock objects have the same interface as the real objects they mimic thereby allowing a client object to remain unaware of whether it is using a real object or a mock object. Many available mock object frameworks allow the programmer to specify which, and in what order, methods will be invoked on a mock object and what parameters will be passed to them as well as what values will be returned. Thus, the behavior of a complex object, such as a network socket, can be mimicked by a mock object, allowing the programmer to discover whether the object being tested responds appropriately to the wide variety of states such mock objects may be in. Many programming scripting languages, such as Python® and Ruby®, can return multiple values, such as from a method. For example, the os.path.splito method may return multiple values. For instance, the statement dir, file=os.path.split("/foo/bar.txt") in the Python® programing language returns multiple values. Such statements may be referred to as "multiple assignment" instructions. A multiple assignment instruction is an assignment statement in which one or more values are given to two or more variables. Mock objects may be written in the form of such multiple assignment instructions. A method call of such mock objects though may not return multiple values because the method call does not have any information about how many items should be returned. As a result, a multiple assignment instruction in scripting languages, such as Python® and Ruby®, results in a failure. For example, the multiple assignment instruction dir, file=mocko.split("/foo/bar.text") would result in a failure. However, the use of mock objects written in the form of multiple assignment instructions in such scripting languages is essential in order to perform a dynamic program analysis. As a result, attempts have been made to avoid such failures by manually defining the default return values at the time of the creation of the mock object, such as via Python®'s unittest.mock package. However, such an approach requires having knowledge of the number of values each method returns, which is infeasible. An alternative approach to avoid such failures is to modify the implementation of an existing scripting language to support built-in mock objects and/or to reveal the necessary information. However, modifying the implementation of the scripting language to support built-in mock objects and/or to reveal the necessary implementation is time-consuming and difficult. Unfortunately, there is not currently a means for effectively handling mock objects written in the form of multiple assignment instructions in scripting programming languages, such as Python® and Ruby®, such as in programs to test software by performing dynamic program analysis.

Embodiments of the present disclosure improve such technology by instrumenting a program to test software so as to obtain an instrumented program having one or more mock objects. "Instrumentation," as used herein, refers to the measure of a software product's performance, to diagnose errors, and to write trace information. In one embodiment, such an instrumented program contains one or more mock objects. A "mock object," as used herein, refers to a simulated object that mimics the behavior of the smallest testable parts of an application in controlled ways, most often as part of a software testing initiative, such as dynamic program analysis. For example, a mock object may be created to test the behavior of another object. The instrumented program is parsed to identify one or more multiple assignment instructions each corresponding to a mock object. A "multiple assignment instruction," as used herein, is an assignment statement in which one or more values are given to two or more variables. A "multiple assignment instruction corresponding to a mock object," as used herein, refers to a mock object written in the form of a multiple assignment instruction. A function is then inserted in the instrumented program for each of the identified multiple assignment instructions corresponding to a mock object, where the function returns a tuple of the first "n" elements of the mock object. The instrumented program (after inserting the function(s) discussed above) is outputted to perform software testing, such as dynamic program analysis. In this manner, by inserting such function(s) in the instrumented program, the mock object(s) will be able to be executed without causing a failure. Furthermore, in this manner, there is an improvement in the technical field involving software testing.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for handling mock objects written in a form of multiple assignment instructions, the method comprising:

inserting a first function in each multiple assignment instruction of a program, wherein said first function returns a tuple of a first n elements of a mock object; and outputting said program to perform software testing after inserting said first function in said program for each multiple assignment instruction.

2. The method as recited in claim 1 further comprising:
instrumenting said program to obtain an instrumented program having one or more mock objects, wherein said one or more mock objects are simulated objects that mimic a behavior of real objects.

3. The method as recited in claim 2 further comprising:
parsing said instrumented program to identify one or more multiple assignment instructions each corresponding to said mock object.

4. The method as recited in claim 3 further comprising:
counting a number of variables in each of said one or more identified multiple assignment instructions.

5. The method as recited in claim 3 further comprising:
parsing said instrumented program to identify each loop instruction containing one or more of said identified one or more multiple assignment instructions.

6. The method as recited in claim 5 further comprising:
inserting a second function in each of said identified loop instruction of said instrumented program, wherein said second function returns of list of said first functions.

7. The method as recited in claim 1, wherein said program is to perform dynamic program analysis.

8. A computer program product for handling mock objects written in a form of multiple assignment instructions, the computer program product comprising one or more computer readable storage mediums having program code embodied therewith, the program code comprising programming instructions for:
inserting a first function in each multiple assignment instruction of a program, wherein said first function returns a tuple of a first n elements of a mock object; and
outputting said program to perform software testing after inserting said first function in said program for each multiple assignment instruction.

9. The computer program product as recited in claim 8, wherein the program code further comprises the programming instructions for:
instrumenting said program to obtain an instrumented program having one or more mock objects, wherein said one or more mock objects are simulated objects that mimic a behavior of real objects.

10. The computer program product as recited in claim 9, wherein the program code further comprises the programming instructions for:
parsing said instrumented program to identify one or more multiple assignment instructions each corresponding to said mock object.

11. The computer program product as recited in claim 10, wherein the program code further comprises the programming instructions for:
counting a number of variables in each of said one or more identified multiple assignment instructions.

12. The computer program product as recited in claim 10, wherein the program code further comprises the programming instructions for:
parsing said instrumented program to identify each loop instruction containing one or more of said identified one or more multiple assignment instructions.

13. The computer program product as recited in claim 12, wherein the program code further comprises the programming instructions for:
inserting a second function in each of said identified loop instruction of said instrumented program, wherein said second function returns of list of said first functions.

14. The computer program product as recited in claim 8, wherein said program is to perform dynamic program analysis.

15. A system, comprising:
a memory for storing a computer program for handling mock objects written in a form of multiple assignment instructions; and
a processor connected to said memory, wherein said processor is configured to execute program instructions of the computer program comprising:
inserting a first function in each multiple assignment instruction of a program, wherein said first function returns a tuple of a first n elements of a mock object; and
outputting said program to perform software testing after inserting said first function in said program for each multiple assignment instruction.

16. The system as recited in claim 15, wherein the program instructions of the computer program further comprise:
instrumenting said program to obtain an instrumented program having one or more mock objects, wherein said one or more mock objects are simulated objects that mimic a behavior of real objects.

17. The system as recited in claim 16, wherein the program instructions of the computer program further comprise:
parsing said instrumented program to identify one or more multiple assignment instructions each corresponding to said mock object.

18. The system as recited in claim 17, wherein the program instructions of the computer program further comprise:
counting a number of variables in each of said one or more identified multiple assignment instructions.

19. The system as recited in claim 17, wherein the program instructions of the computer program further comprise:
parsing said instrumented program to identify each loop instruction containing one or more of said identified one or more multiple assignment instructions.

20. The system as recited in claim 19, wherein the program instructions of the computer program further comprise:
inserting a second function in each of said identified loop instruction of said instrumented program, wherein said second function returns of list of said first functions.

* * * * *